(12) United States Patent
Wilder et al.

(10) Patent No.: US 12,539,022 B2
(45) Date of Patent: Feb. 3, 2026

(54) ARTICULATION CONTROL DEVICE AND METHODS OF USE

(71) Applicant: Boston Scientific Scimed, Inc., Maple Grove, MN (US)

(72) Inventors: Evan Wilder, Boston, MA (US); Sean Powell, Holden, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 642 days.

(21) Appl. No.: 17/806,778

(22) Filed: Jun. 14, 2022

(65) Prior Publication Data

US 2023/0000312 A1 Jan. 5, 2023

Related U.S. Application Data

(60) Provisional application No. 63/217,005, filed on Jun. 30, 2021.

(51) Int. Cl.
*A61B 1/005* (2006.01)
*A61B 1/00* (2006.01)

(52) U.S. Cl.
CPC ........ *A61B 1/0053* (2013.01); *A61B 1/00096* (2013.01); *A61B 1/0057* (2013.01)

(58) Field of Classification Search
CPC ..... A61B 1/0052; A61B 1/0057; F16H 19/06; F16H 19/005; F16H 19/0659; F16H 2035/003
See application file for complete search history.

(56) References Cited

U.S. PATENT DOCUMENTS

| | | | | |
|---|---|---|---|---|
| 2008/0275302 | A1* | 11/2008 | Hosaka | A61B 1/0052 600/139 |
| 2010/0243377 | A1* | 9/2010 | Duval | F16H 19/0659 254/390 |
| 2012/0220832 | A1* | 8/2012 | Nakade | A61B 1/0057 600/149 |
| 2016/0073856 | A1* | 3/2016 | Saito | A61B 1/0057 600/149 |
| 2019/0059700 | A1 | 2/2019 | Matsuda | |
| 2021/0212553 | A1* | 7/2021 | Appling | A61B 1/00042 |

FOREIGN PATENT DOCUMENTS

| | | |
|---|---|---|
| EP | 2649922 A4 | 1/2018 |
| JP | 2007325627 A | 12/2007 |
| JP | 4323210 B2 | 9/2009 |

OTHER PUBLICATIONS

International Search Report issued in International Application No. PCT/US2022/072919 dated Sep. 19, 2022 (58 pages).

* cited by examiner

*Primary Examiner* — Alexandra L Newton
(74) *Attorney, Agent, or Firm* — Bookoff McAndrews PLLC (57) ABSTRACT

A medical device includes a handle including an actuating device, a shaft extending from the handle and having a longitudinal axis, a cam rotatably connected to the handle, wherein the cam includes a first section and a second section, and wherein a distance between a radially outer surface of the first section and a center of the cam is different from a distance between a radially outer surface of the second section and the center of the cam; and an actuation wire extending from the cam to a distal end of the shaft. Rotation of the actuating device rotates the cam, causing the actuating wire to wrap around the first section and the second section to deflect the distal end of the shaft.

18 Claims, 4 Drawing Sheets

ARTICULATION CONTROL DEVICE AND METHODS OF USE

CROSS-REFERENCE TO RELATED APPLICATIONS

This application claims the benefit of priority of U.S. Provisional Patent Application No. 63/217,005, filed Jun. 30, 2021, the entirety of which is incorporated herein by reference.

TECHNICAL FIELD

This disclosure relates generally to medical devices and related methods of use. More particularly, in some embodiments, the disclosure relates to using one or more actuators to control an articulation of an endoscope and/or medical instruments independent of, or associated with, the endoscope.

BACKGROUND

Scopes may be used for accessing target sites within a body, and one or more medical tools may be advanced through one or more lumens of a scope, and the scope and/or the medical tools may be articulated to gain access to, diagnose, or treat the target site. Handles may include one or more articulation mechanisms, e.g., knobs or the like, which may be connected to actuation wires. Actuation of the articulation mechanisms by a user may cause articulation of a portion of the scope and/or the medical tools. Drawbacks of these endoscopic systems include, for example, increased tension felt by the user as an articulation mechanism is rotated to cause a maximum bend in the articulation member. For example, as the articulation mechanism is rotated, an actuation wire connected to the articulation member winds around the articulation mechanism and/or a member attached to the articulation mechanism (e.g., a cam), increasing the tension felt by the user. This increased tension may cause hand fatigue, which may create difficulties in performing therapies. Furthermore, the design of conventional articulation mechanisms may change articulation response of the scope and/or the medical tools as the articulation mechanism is rotated. This may decrease responsiveness of the articulation joint as an angle of the articulation joint relative to a longitudinal axis of the scope increases. This disclosure may solve one or more of these problems or other problems in the art. The scope of the disclosure, however, is defined by the attached claims and not the ability to solve a specific problem.

SUMMARY OF THE DISCLOSURE

According to an aspect, a medical device includes a handle including an actuating device, a shaft extending from the handle and having a longitudinal axis, a cam rotatably connected to the handle, wherein the cam includes a first section and a second section, and wherein a distance between a radially outer surface of the first section and a center of the cam is different from a distance between a radially outer surface of the second section and the center of the cam, and an actuation wire extending from the cam to a distal end of the shaft, wherein rotation of the actuating device rotates the cam, causing the actuating wire to wrap around the first section and the second section to deflect the distal end of the shaft.

The first section and the second section may define a path of travel for the actuation wire, wherein the first section may have a first radius of curvature, and wherein the second section may have a second radius of curvature.

The radially outer surface of the first section may define a first curve having the first radius of curvature, the first radius of curvature may be uniform from a first end of the first curve to a second end of the first curve, and the radially outer surface of the second section may define a second curve having the second radius of curvature which may decrease in size from a first end of the second curve to a second end of the second curve.

The cam may include a third section extending from the second section, and wherein the first section, the second section, and the third section may form a continuous path.

The third section may include a linear radially outer surface, and wherein a distance between the center of the cam and the linear radially outer surface may be different along an entirety of the third section.

A distance between the radially outer surface of the second section and the center of the cam may be greater than a distance between at least a portion of the radially outer surface of the third section and the center of the cam.

A fourth section may extend from the third section, wherein a distance between the radially outer surface of the fourth section and the center of the cam and the distance between the radially outer surface of the first section and the center of the cam may be equal.

The first section and the second section may form a first path, wherein a second path may be formed on the cam in a plane parallel to a plane of the first path, wherein the second path may include a first portion having a first radius and a second portion having a second radius, and wherein the first radius and the second radius may not be equal.

The first path and the second path may not be mirror images about a plane between and parallel to the first and second paths and bisecting the cam.

Rotation of the cam in a clockwise direction may cause the actuation wire to wrap onto the first path, and wherein rotation of the cam in a counterclockwise direction may cause a second actuation wire to wrap onto the second path.

Rotation of the actuation device from an angle of zero degrees to 180 degrees may be configured to deflect a portion of the shaft a smaller angle relative to the longitudinal axis of the shaft than rotation of the actuation device from 180 degrees to 360 degrees.

The cam may include a recess, and wherein a diameter of a proximal portion of the actuation wire may be greater than a diameter of a distal end of the actuation wire, and wherein the proximal portion of the actuation wire may be configured to be received by the recess.

The actuation device may be keyed to the cam and movement of the actuation mechanism may be configured to move the cam.

A locking mechanism may be rotatable about a same axis as the cam, wherein the locking mechanism may be configured to move from a first position to a second position, wherein the cam may be capable of being rotated when the locking mechanism is in the first position, and wherein the cam may be incapable of being rotated when the locking mechanism is in the second position.

The device may further include a second actuating device, and a second cam keyed to the second actuating device, wherein the second cam may include a path having a first radius and a second radius, and wherein the first radius and the second radius may be different.

According to another aspect, a medical device includes a handle including an actuating device, a shaft extending from the handle and having a longitudinal axis, and a cam rotatably connected to the handle, wherein the cam includes a first section and a second section defining a path of travel for an actuation wire, and wherein a radially outer surface of the first section has a first radius of curvature, and a radially outer surface of the second section has a second radius of curvature different from the first radius of curvature, and wherein actuation of the actuating device causes the actuation wire to wrap around the radially outer surfaces of the first and second sections, causing the shaft to bend.

The path may further include a third section extending from the second section, and wherein the first section, the second section, and the third section may form a continuous path.

The cam may further include a second path parallel to the first path, and wherein the first path and the second path may be rotationally offset about a center axis of the cam.

According to another aspect, a method includes inserting a shaft of an insertion device into a body via an opening, advancing the insertion device so that a distal end of the insertion device is adjacent to a target site, rotating a first control mechanism about a rotation axis in a first direction, and causing the shaft to be deflected from a position parallel to a longitudinal axis of the shaft based on the rotation, wherein as the first control mechanism is rotated in the first direction, a torque is gradually reduced on the first control mechanism.

Continued rotation of the first control mechanism in the first direction may increase the torque on the first control mechanism.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The present disclosure is described with reference to exemplary medical systems and medical tools for accessing a target site, for example, for accessing a target site from different directions and/or different angles at a distal end of an endoscope. This may provide improved medical tool functionality and/or assist medical professionals to gain improved access to the target site for performing medical procedures. However, it should be noted that reference to any particular device and/or any particular procedure is provided only for convenience and not intended to limit the disclosure. A person of ordinary skill in the art would recognize that the concepts underlying the disclosed devices and application methods may be utilized in any suitable device or procedure, medical or otherwise. This disclosure may be understood with reference to the following description and the appended drawings, wherein like elements are referred to with the same reference numerals.

For ease of description, portions of the disclosed devices and/or their components are referred to as proximal and distal portions. It should be noted that the term "proximal" is intended to refer to portions closer to a user of the devices, and the term "distal" is used herein to refer to portions further away from the user. Similarly, extends "distally" indicates that a component extends in a distal direction, and extends "proximally" indicates that a component extends in a proximal direction. Further, as used herein, the terms "about," "approximately" and "substantially" indicate a range of values within +/−10% of a stated or implied value. Additionally, terms that indicate the geometric shape of a component/surface refer to exact and approximate shapes.

Figure 1:
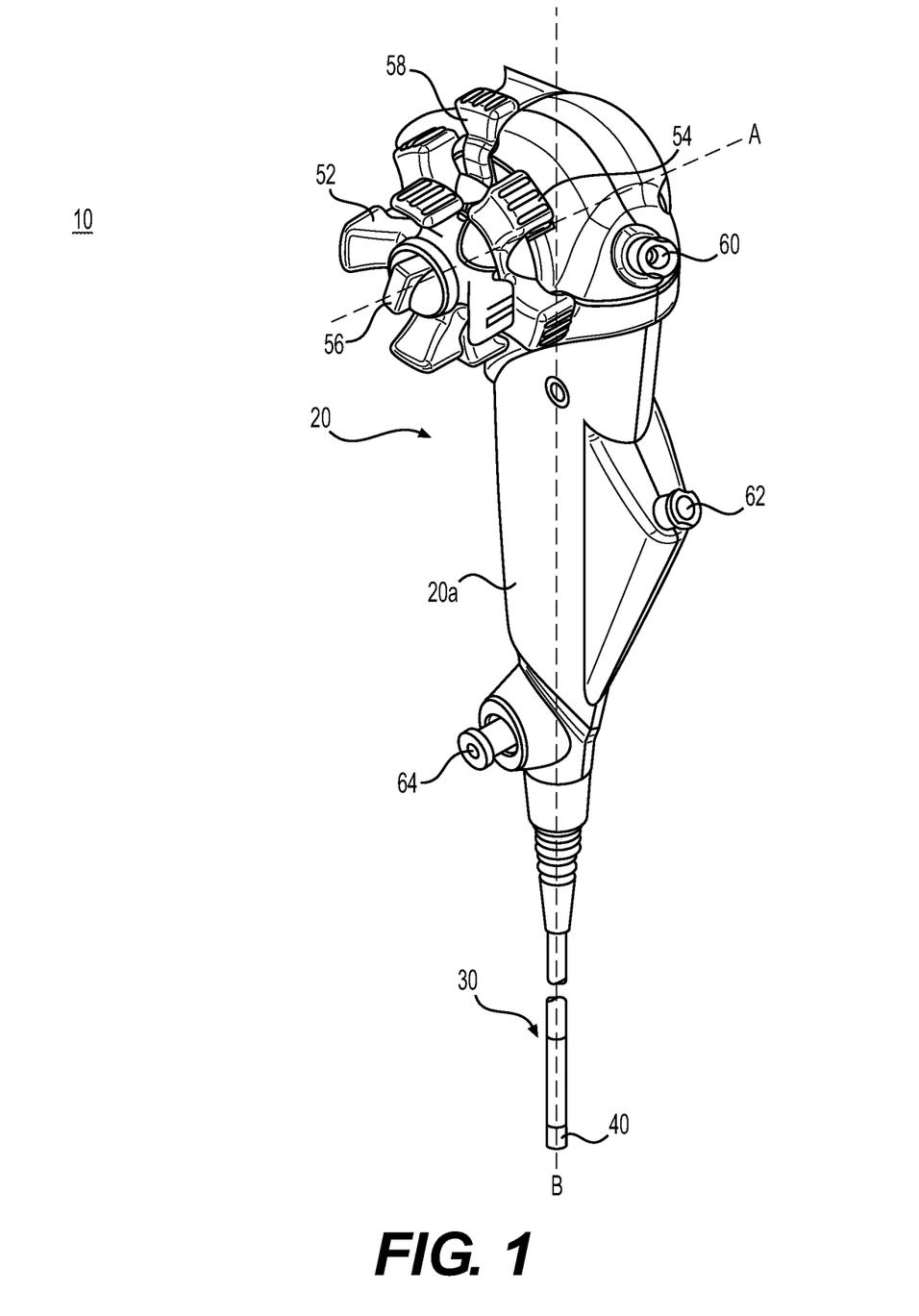
FIG. 1 is a schematic view of a medical system according to an embodiment.

Referring to FIG. 1, a medical system 10 according to an embodiment is shown. Medical system 10 may include a handle 20, a shaft 30 (e.g., a catheter, a sheath, etc.) extending from a distal end of handle 20, and a distal tip 40 at a distal end of shaft 30. Handle 20 may include a plurality of ports 60, 62, 64 which may be fluidly connected to one or more lumens (not shown) extending from a proximal end of shaft 30 and which may terminate at one or more openings (not shown) in distal tip 40. Medical tools may be introduced through one or more ports 60, 62, 64 and may be exposed from an opening (not shown) in shaft 30 and/or distal tip 40 to perform one or more therapies on a target tissue. Alternatively, or additionally, a suction and/or a fluid source may be attached to one or more ports 60, 62, 64 to remove tissue or other objects via suction and/or to introduce a fluid to the target site. Alternatively, or additionally, one or more ports 60, 62, 64 may be attached to a display or control device via an umbilicus (not shown). The umbilicus may include one or more wires which may connect to wires of an imaging device and/or an illumination device (not shown) provided at distal tip 40. Control signals and/or power may be supplied to the imaging device or the illumination device to control operation thereof.

Handle 20 may further include actuating devices 52, 54 (e.g., knobs) which may be pivotally connected to handle 20 via an axis A. A locking mechanism 56 may also be rotatably connected to handle 20 along axis A and may rotate about axis A from a first position to a second position. In a first position, locking mechanism 56 may prevent rotation of actuating devices 52, 54. When locking mechanism 56 is in the second position, actuating devices 52, 54 may rotate freely about axis A. It will be understood that more than one locking mechanism 56 may be connected to handle 20, such that each of actuating devices 52, 54 includes locking mechanism 56. Locking mechanism 56 may be any known locking mechanism for preventing rotation of actuating devices (e.g., actuating devices 52, 54 shown in FIG. 2) and may include a rotatable lever, a twist device, or the like.

Figure 2:
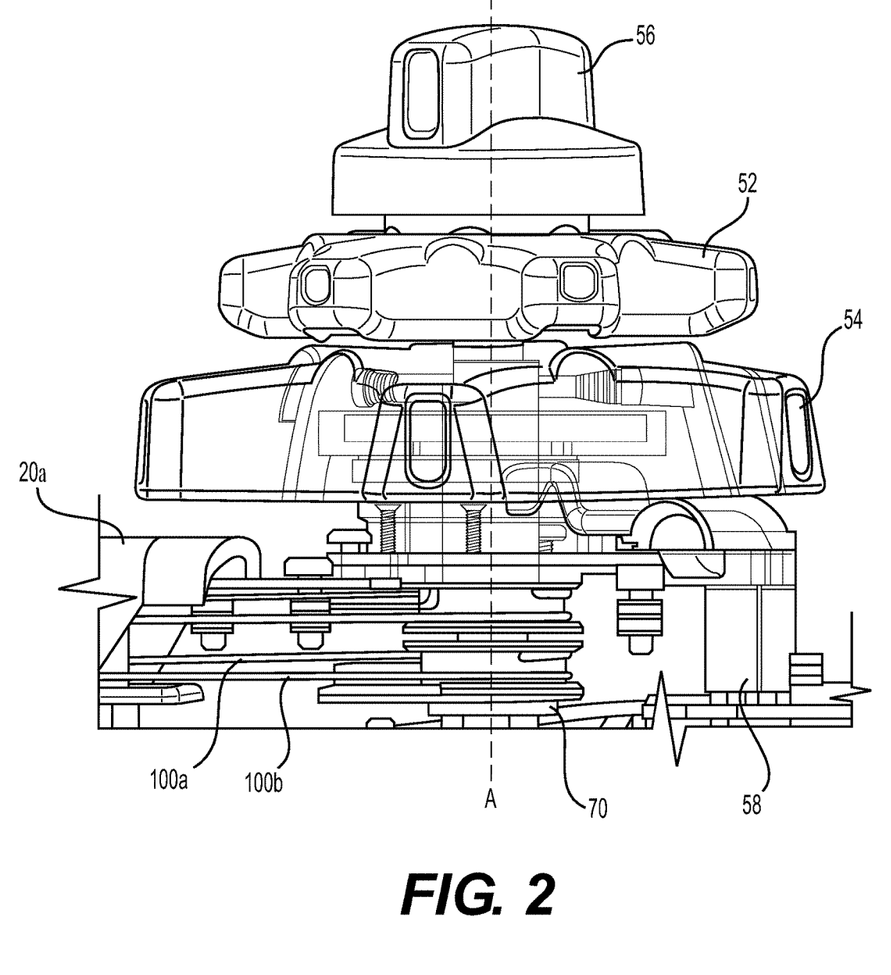
FIG. 2 is a schematic view of a handle of the endoscope system of FIG. 1, according to an embodiment.

With reference to FIG. 2, actuating devices 52, 54 are aligned along axis A. A cam 70 may be keyed to each of actuating devices 52, 54, i.e., each actuating device 52, 54 couples to a corresponding cam 70 (for ease of understanding, a single cam 70 is shown in FIG. 2). Cam 70 may be located within a housing 20*a* of handle 20. As will be explained herein, a first actuating wire 100*a* and a second actuating wire 100*b* may be attached to cam 70. First and second actuating wires 100*a*, 100*b* extend distally through handle 20, into shaft 30, and may be connected at a distal end thereof to one or more locations of shaft 30 and/or distal tip 40, e.g., an articulation joint. As will be described in greater detail herein, rotation of one of actuating device 52, 54 about axis A, e.g., in a clockwise or a counterclockwise direction, may cause cam 70 to rotate in a same direction. As cam 70 is rotated, the slack of either first actuating wire 100a (e.g., when cam 70 is rotated in a clockwise direction) or second actuating wire 100b (e.g., when cam 70 is rotated in a counter-clockwise direction) may be taken up and may begin to wind around cam 70, which may cause distal tip 40 and/or a portion of shaft 30 to bend relative to longitudinal axis B.

According to an example, each actuating devices 52, 54 may be coupled to a cam 70 via a shaft. For example, a first shaft (not shown) may connect actuating device 52 to a first cam 70 and a second shaft (not shown) may connect actuating device 54 to a second cam 70. As described herein, cam 70 and actuating devices 52, 54 may share a rotation axis. In some instances, one or both of the first shaft and the second shaft may include a lumen such that one of the first shaft or the second shaft may be disposed within the lumen of the respective shaft. In other words, the first shaft may surround the second shaft, or the second shaft may surround the first shaft. In this manner, the first shaft and the second shaft may be coaxial. This may allow actuating devices 52, 54 and respective cams 70 to also be coaxial.

Figure 3:
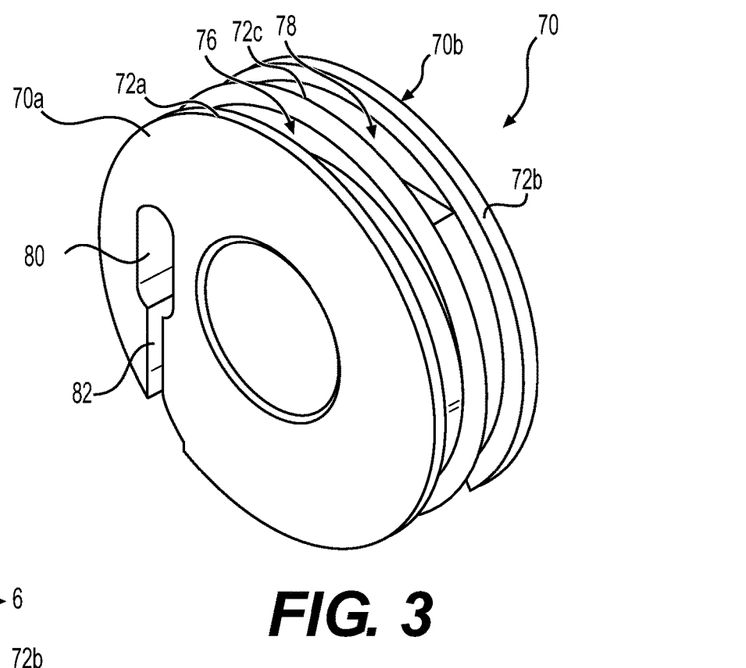
FIG. 3 is a schematic view end of a cam member of the endoscope system of FIG. 1, according to an embodiment.
Figure 4:
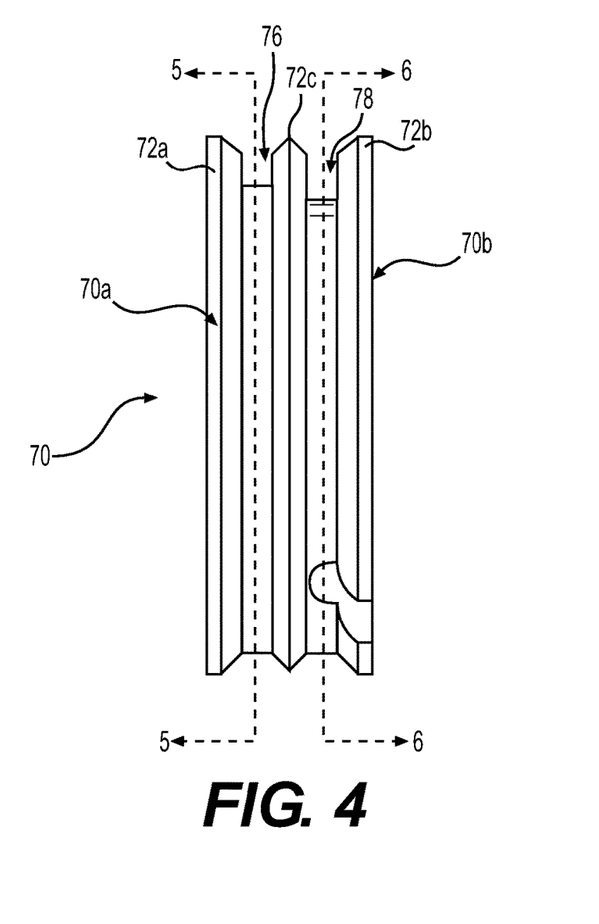
FIG. 4 is a side-view of the cam member of FIG. 3, according to an embodiment.

Cam 70 may include a first side 70a and a second side 70b, as shown in FIGS. 3 and 4. First actuating wire 100a (FIG. 2) may include a ferrule (not shown) at its proximal-most end. The ferrule may have a diameter greater than a diameter of a distal portion of first actuating wire 100a. The ferrule may be seated in a slot 80 (e.g., a recess or opening) (FIG. 5) formed in an outer surface of first side 70a. Seating the ferrule in slot 80 may fix first actuating wire 100a relative to cam 70. A portion of first actuating wire 100a may be received by a recess 82 (FIG. 5) to allow first actuating wire 100a to extend from slot 80, into recess 82, and wrap around all or a portion of a circumference of cam 70. Second side 70b of cam 70 may have a similar configuration. For example, a slot 80' may be formed in an outer surface of second side 70b of cam 70, and a ferrule (not shown) of second actuating wire 100b may be received in slot 80'. The ferrule may have a diameter greater than a diameter of a distal portion of second actuating wire 100b. A portion of second actuating wire 100b may be received by a recess 82' (FIG. 6) to allow second actuating wire 100b to extend from slot 80' and wrap around all or a portion of a circumference of cam 70 in a direction opposite the direction of first actuating wire 100a.

With continued reference to FIGS. 3 and 4, a first wire path 76 may be formed closer to first side 70a of cam 70, and a second wire path 78 may be formed closer to second side 70b of cam 70. For example, a wall 72a may define an outermost surface of cam 70 on first side 70a, a wall 72b may define an outermost surface of cam 70 on second side 70b, and wall 72c may be formed between first wire path 76 and second wire path 78. According to an example, first wire path 76 may be a circumferential slot and may be formed between, or may be defined by, walls 72a and 72c, where each of walls 72a and 72c may extend further in a radial direction than an outermost surface of first wire path 76. Second wire path 78 may also include a circumferential slot and may be formed between, or may be defined by, walls 72b and 72c, where each of walls 72b and 72c extend further in a radial direction than an outermost surface of second wire path 78.

Figure 5:
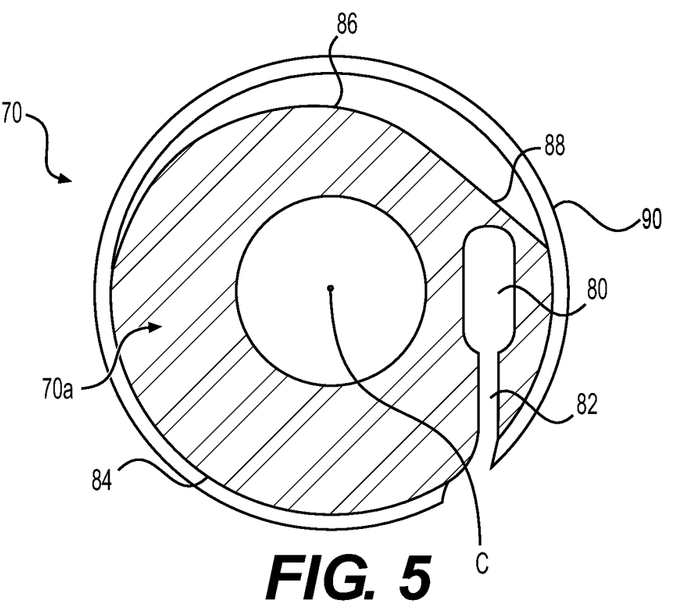
FIG. 5 is cross-section of the cam member taken along a line 5-5 in FIG. 4, according to an embodiment.

A cross-section of first side 70a along line 5-5 of FIG. 4 is shown in FIG. 5. First wire path 76 may include one or more sections, such as a first section 84, a second section 86, a third section 88, and a fourth section 90. First section 84 may include a curved radially-outermost surface extending from recess 82 to second section 86. Second section 86 may include a curved radially-outermost surface extending from first section 84 to third section 88. Third surface 88 may include a linear radially-outermost surface extending from second section 86 and terminating at an end opposite second section 86. Fourth section 90 may include a curved radially-outermost surface extending from third section 88 and terminating at recess 82. In other embodiments, each of first section 84, second section 86, third section 88, and fourth section 90 may include curved and/or linear portions. First wire path 76 may include less than four sections or may include more than four sections, e.g., one, two, three, five, six, or more sections, and the shape of these sections may be curved and/or linear. It will be understood that first section 84, second section 86, third section 88, and fourth section 90 may form a single continuous path along first wire path 76. Alternatively, openings or breaks along first wire path 76 may be formed to reduce material without taking away from the ability of an actuation wire from wrapping onto or off of first path 76 as described herein. It will also be understood that any of sections 84, 86, 88, or 90 may be formed of a plurality of linear sections, which may form a generally circular surface.

As will be described in more detail, a distance from a center C of cam 70 to each point along the radially outermost surfaces of each of first section 84, second section 86, third section 88, and fourth section 90 may be fixed or may vary. For example, the distance between center C of cam 70 to points on one or more of first section 84, second section 86, third section 88, and/or fourth section 90 may change over one or more portions of each section. For example, as shown in FIG. 5, a distance between a surface of second section 86 to center C may decrease from first section 84 to third section 88.

According to an example, first section 84 may extend approximately fifty percent around a circumference of cam 70 from recess 82. A distance between center C and points along a radially-outermost surface of first section 84 may be constant along an entirety of first section 84. This constant distance may cause increased torque felt by a user as an actuation mechanism connected to cam 70 is rotated to cause an actuation wire (e.g., actuation wire 100a) to wind onto first section 84. This constant distance may provide increased control of an articulation joint as compared to when the actuation wire is wound onto second section 86 and third section 88. For example, a minor rotation of cam 70 when the articulation wire is wrapping onto, or off of, first section 84 may provide improved steering control of the articulation joint than a same amount of rotation of cam 70 when the articulation wire is wrapping onto, or off of, second section 86 or third section 88, as will be explained herein. In some instances, the distance between points along a radially-outermost surface of first section 84 and center C of cam 70 may be greater than in conventional cam devices, which may improve steering control of the actuation joint at low rotation angles. A distance between a surface of each of sections 84, 86, 88, and 90 and center C may be between approximately 0.100 inches and approximately 0.500 inches. An angular distance, e.g., a circumferential distance about cam 70, of first section 84 may be approximately 90° to approximately 150°, of second section 86 may be approximately 70° to approximately 130°, of third section 88 may be approximate 10° to approximately 70°, and of fourth section 90 may be approximately 50° to approximately 110°.

With continued reference to FIG. 5, second section 86 may be curved. A distance between points along a radially outermost surface of second section 86 and center C of cam 70 may decrease from the end of first section 84 to the beginning of third section 88. This decreasing distance may decrease an amount of tension felt by the user as the user rotates the corresponding actuating device 52, 54. As described above, responsiveness of the articulation joint may also decrease based on this decreased distance.

Third section 88 may include a linear radially-outermost surface, such that a distance between third section 88 and center C may decrease from the intersection of second section 86 and third section 88 to a center of third section 88, and then may increase from the center of third section 88 to an end of third section 88. This decreased distance relative to the distance between center C and first section 84 may decrease an amount of tension felt by the user as cam 70 and an associated actuation mechanism are rotated about axis A in FIG. 2. Fourth section 90 may include a curved radially-outermost surface. In some instances, a distance from all points along fourth section 90 may be a same distance from center C of cam 70 as the points along first section 84, but is not limited thereto. In some embodiments, rotation of cam 70 may be terminated such that the actuation wire does not wrap onto fourth section 90. In other embodiments, the actuation wire is wrapped onto fourth section 90. As described above, responsiveness of the articulation joint when the actuation wire is located along third section 88 may be decreased relative to the responsiveness of the articulation joint when the actuation wire is wrapping onto or off of first section 84. For example, first section 82 may extend approximately halfway (e.g., 180 degrees) about a circumference of cam 70. In this instance, rotation of cam 70 from zero degrees to 180 degrees may deflect shaft 30 at a smaller angle relative to longitudinal axis A than when cam 70 is rotated between 180 degrees and 360 degrees.

Figure 6:
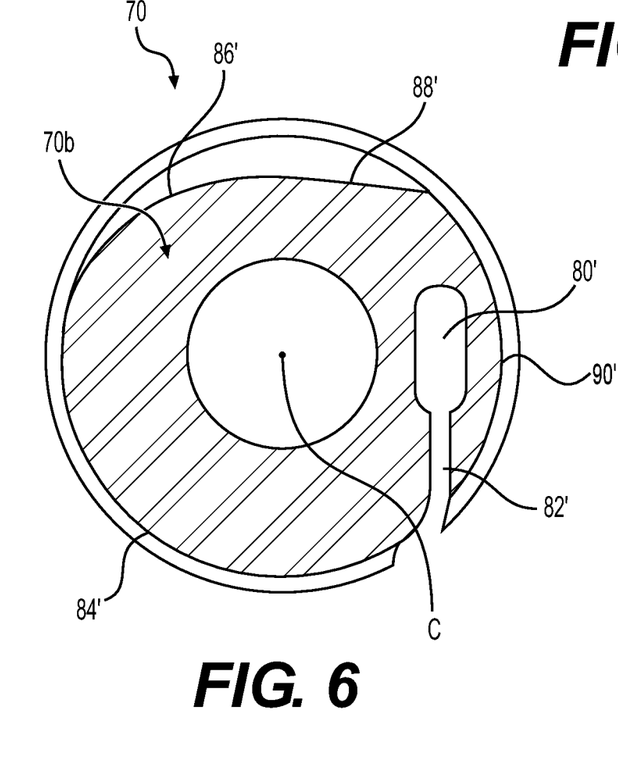
FIG. 6 is cross-section of the cam member taken along a line 6-6 in FIG. 4, according to an embodiment.

A cross-section of second side 70b along line 6-6 in FIG. 4 is shown in FIG. 6. Second wire path 78 of second side 70b may include similar sections as first wire path 76, e.g., a first section 84' which may include a curve having a constant radius, a second section 86' which may have a curve having a decreasing radius, a third section 88' which may be linear, and a fourth section 90' which may include a curve having a same or a different radius as the radius of the curve of first section 84'. It will be understood, however, that first section 84', second section 86', third section 88', and fourth section 90' are not limited to these orientations and, as with first wire path 76, may include one, two, three, five, six, or more sections. In addition, a distance between the sections of first wire path 76 and center C of cam 70 and a distance between the sections of second wire path 78 and center C of cam 70 may be the same, or may be different. First wire path 76 and second wire path 78 may include the same number of sections, as shown in FIGS. 5 and 6, or may have a different number of sections. It will be understood that first section 84', second section 86', third section 88', and fourth section 90' may form a single continuous path along second wire path 78. Alternatively, openings or breaks along second wire path 78 may be formed to reduce material without taking away from the ability of an actuation wire from wrapping onto or off of first path 76 as described herein. It will also be understood that any of sections 84', 86', 88', or 90' may be formed of a plurality of linear sections, which may form a generally circular surface.

As shown in FIG. 4, first side 70a and second side 70b of cam 70 may be parallel to each other and may be flipped relative to each other. In other words, first wire path 76 and second wire path 78 may not be mirror images about a plane between and parallel to first wire path 76 and second wire path 78. First wire path 76 and second wire path 78 may be offset about 20 degrees as shown in FIG. 4. In this instance, cam 70 may control deflection of shaft 30 and/or distal tip 40 in right/left directions. The offset of first wire path 76 and second wire path 78 may allow an actuation wire connected to one wire path, e.g., first wire path 76, to be in slack while an actuation wire connected to the other wire path, e.g., second wire path 78, is in tension. The offset of first wire path 76 and second wire path 78 may enable the machining of cam 70 and/or may prevent actuation wires from moving from one path to another during use. In another example, first wire path 76 and second wire path 78 are not offset radially from each other. According to an example, first wire path 76 may extend in a first direction around cam 70, e.g., in a clockwise direction, while second wire path 78 may extend in an opposite direction about cam 70, e.g., a counterclockwise direction. Rotation of cam 70 in a first direction (e.g., a clockwise direction) may cause a first actuation wire to wrap onto first wire path 76 and/or may cause a second actuation wire to wrap off of second wire path 78. Rotation of cam 70 in a second direction, opposite of the first direction (e.g., a counterclockwise direction) may cause the first actuation wire to wrap off of first wire path 76 and/or may cause the second actuation wire to wrap onto second wire path 78.

A method of operation of medical system 10 may be described. Medical system 10 may be inserted into a body via an opening, e.g., an incision or via a natural orifice. Distal tip 40 may be advanced to a target site by pushing shaft 30 in a distal direction. As shaft 30 is pushed distally, one or more tortuous paths may be navigated by medical system 10. A user may rotate actuating device 52 in a clockwise or a counter-clockwise direction, which may deflect distal tip 40 in a first plane, e.g., up-down relative to longitudinal axis B, and may rotate actuating device 54 in a clockwise or a counter-clockwise direction, which may deflect distal tip 40 in a second plane, e.g., right-left relative to longitudinal axis B. As actuating devices 52, 54 are rotated, the articulation mechanism (e.g., a wire) may be taken up by a corresponding cam 70 in the direction in which actuating devices 52, 54 are turned. For example, rotating actuating device which is keyed or connected to cam 70 may cause actuation wire 100a to begin to be taken up and wrap onto first section 84. The user may have improved control over the articulation of shaft 30 and/or distal tip 40 at this stage, but the torque felt by the user may increase as articulation wire 100a continues to wrap onto first section 84.

Continued rotation of actuating device 52 may cause actuation wire 100a to wrap onto second section 86. As actuation wire 100a is wrapped onto second section 86, control over the actuation of shaft 30 and/or distal tip 40 may be diminished, but torque felt by the user may also be reduced. Continued rotation of actuating device 52 may cause actuation wire 100a to wrap onto third section 88. As actuation wire 100a is wrapped onto third section 88, control over the actuation of shaft 30 and/or distal tip 40 may be increased, but torque felt by the user may increase. It will be understood that actuating device 52 and/or actuating device 54 may be rotated both clockwise and/or counter-clockwise multiple times during a procedure. Thus, the torque felt by the user and the control over shaft 30 and/or distal tip 40 may continue to change during rotation based on the position of an actuation wire on a respective cam 70.

While embodiments have been described relevant to actuation mechanisms attached to handle 20 for deflecting shaft 30 and /or distal tip 40, it will be understood that any medical device used with medical system 10, or separately from medical system 10, may include cam 70 described herein, which may be used to deflect a portion of the medical device and which may be used to reduce torque associated with rotation of an actuation device.

It will be apparent to those skilled in the art that various modifications and variations can be made to the disclosed device without departing from the scope of the disclosure. For example, the varying torque felt by the user, the change in control of the shaft and/or distal end, and the number of actuation mechanism may be modified based on a desired medical therapy. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A medical device, comprising:
   a handle including an actuating device;
   a shaft extending from the handle and having a longitudinal axis;
   a cam rotatably connected to the handle, wherein the cam includes a first section, a second section, and a third section, wherein a distance between a radially outer surface of the first section and a center of the cam is different from a distance between a radially outer surface of the second section and the center of the cam; and
   an actuation wire extending from the cam to a distal end of the shaft, wherein rotation of the actuating device rotates the cam, causing the actuation wire to wrap around the first section, the second section, and the third section to deflect the distal end of the shaft, wherein first section, the second section, and the third section define a continuous path of travel for the actuation wire, wherein the first section defines a first curve having a first radius of curvature that is uniform from a first end of the first curve to a second end of the first curve, wherein the second section defines a second curve having a second radius of curvature that decreases from a first end of the second curve to a second end of the second curve, wherein the third section defines a linear radially outer surface, wherein the first end of the second curve is continuous with the second end of the first curve, wherein the second end of the second curve is continuous with a first end of the linear radially outer surface of the third section, and wherein a proximalmost end of the actuation wire is secured in a recess in the cam, wherein a radially outermost end of the recess is between the first end of the first curve and a second end of the linear radially outer surface of the third section.

2. The device of claim 1, wherein a distance between the radially outer surface of the second section and the center of the cam is greater than a distance between at least a portion of the radially outer surface of the third section and the center of the cam.

3. The device of any of claim 1, further comprising a fourth section extending from the third section, wherein a distance between the radially outer surface of the fourth section and the center of the cam and the distance between the radially outer surface of the first section and the center of the cam are equal.

4. The device of claim 1, wherein the path is a first path, wherein the actuation wire is a first actuation wire, wherein a second path of travel for a second articulation wire is formed on the cam in a plane parallel to a plane of the first path, wherein the second path includes a first portion having a first radius and a second portion having a second radius, and wherein the first radius and the second radius are not equal.

5. The device of claim 4, wherein the first path and the second path are not mirror images about a plane between and parallel to the first and second paths and bisecting the cam.

6. The device of claim 4, wherein rotation of the cam in a clockwise direction causes the first actuation wire to wrap onto the first path, and wherein rotation of the cam in a counterclockwise direction causes the second actuation wire to wrap onto the second path.

7. The device of claim 1, wherein rotation of the actuating device from an angle of zero degrees to 180 degrees is configured to deflect a portion of the shaft a smaller angle relative to the longitudinal axis of the shaft than rotation of the actuating device from 180 degrees to 360 degrees.

8. The device of claim 1, and wherein a diameter of the proximalmost end of the actuation wire is greater than a diameter of a distal end of the actuation wire.

9. The device of claim 1, further comprising a locking mechanism rotatable about a same axis as the cam, wherein the locking mechanism is configured to move from a first position to a second position, wherein the cam is capable of being rotated when the locking mechanism is in the first position, and wherein the cam is incapable of being rotated when the locking mechanism is in the second position.

10. The device of claim 1, further comprising:
    a second actuating device; and
    a second cam keyed to the second actuating device, wherein the second cam includes a path having a first radius and a second radius, and wherein the first radius and the second radius are different.

11. A medical device, comprising:
    a handle including an actuating device;
    a shaft extending from the handle and having a longitudinal axis; and
    a cam rotatably connected to the handle, wherein the cam includes a first section, a second section, a third section, and a fourth section, wherein the first section, the second section, and the third section define a path of travel for an actuation wire, wherein a radially outer surface of the first section has a first radius of curvature, and a radially outer surface of the second section has a second radius of curvature different from the first radius of curvature, wherein an entirety of the third section includes a linear radially outer surface, and wherein the fourth section has a third radius of curvature that is constant, such that a boundary between the third section and the fourth section forms a corner and
    wherein actuation of the actuating device causes the actuation wire to wrap around the radially outer surfaces of the first, second, and third sections, causing the shaft to bend, and wherein the first section, the second section, and the third section form a continuous path of travel for the actuation wire.

12. The device of claim 11, wherein a distance between the radially outer surface of the fourth section and a center of the cam and the distance between the radially outer surface of the first section and the center of the cam are equal.

13. The device of claim 11, wherein rotation of the actuating device from an angle of zero degrees to 180 degrees is configured to deflect a portion of the shaft a smaller angle relative to the longitudinal axis of the shaft than rotation of the actuating device from 180 degrees to 360 degrees.

14. The device of claim 11, wherein the actuating device is keyed to the cam and movement of the actuating device is configured to move the cam.

15. The device of claim 1, wherein the recess extends from the outermost end to an inner end, wherein the inner end of the recess is closer to a center of the cam than the outermost end is.

16. The device of claim 3, wherein the radially outermost end of the recess is between the first end of the first curve and an end of the fourth section.

17. The device of claim 11, wherein a proximalmost end of the actuation wire is secured in a recess having a radially outermost end that is between the first section and the fourth section.

18. The device of claim 11, wherein a distance between a center of the cam and the radially outer surface of the second section only decreases from a first end of the second section to a second end of the second section.

\* \* \* \* \*